(12) United States Patent
Guizar (10) Patent No.: US 8,954,952 B2
(45) Date of Patent: Feb. 10, 2015

(54) PORTABLE BUSINESS PROCESS DEPLOYMENT MODEL ACROSS DIFFERENT APPLICATION SERVERS

(75) Inventor: Alejandro Guizar, Houston, TX (US)

(73) Assignee: Red Hat, Inc., Raleigh, NC (US)

( * ) Notice: Subject to any disclaimer, the term of this patent is extended or adjusted under 35 U.S.C. 154(b) by 1439 days.

(21) Appl. No.: 11/998,508

(22) Filed: Nov. 30, 2007

(65) Prior Publication Data

US 2009/0144729 A1    Jun. 4, 2009

(51) Int. Cl.
*G06F 9/45*   (2006.01)
*G06F 9/445*  (2006.01)

(52) U.S. Cl.
CPC .................................... *G06F 8/60* (2013.01)
USPC ............................ 717/174; 717/168; 717/177

(58) Field of Classification Search
None
See application file for complete search history.

(56) References Cited

U.S. PATENT DOCUMENTS

| | | | |
|---|---|---|---|
| 4,197,430 A | 4/1980 | Dowden | |
| 5,809,297 A | 9/1998 | Kroenke et al. | |
| 6,038,566 A | 3/2000 | Tsai | |
| 6,356,913 B1 | 3/2002 | Chu et al. | |
| 6,654,748 B1 | 11/2003 | Rabung et al. | |
| 7,069,553 B2 * | 6/2006 | Narayanaswamy et al. | 717/173 |
| 7,131,123 B2 * | 10/2006 | Suorsa et al. | 717/177 |
| 7,151,744 B2 | 12/2006 | Sarkinen et al. | |
| 7,231,267 B2 * | 6/2007 | Bournas et al. | 700/91 |
| 7,246,358 B2 | 7/2007 | Chinnici et al. | |
| 7,284,039 B2 | 10/2007 | Berkland et al. | |
| 7,290,258 B2 * | 10/2007 | Steeb et al. | 717/178 |
| 7,322,031 B2 | 1/2008 | Davis et al. | |
| 7,454,492 B2 * | 11/2008 | Bauer et al. | 709/223 |
| 7,487,513 B1 | 2/2009 | Savchenko et al. | |
| 7,519,972 B2 * | 4/2009 | Carr et al. | 719/318 |
| 7,577,964 B2 * | 8/2009 | Beringer et al. | 719/328 |
| 7,600,005 B2 * | 10/2009 | Jamkhedkar et al. | 717/174 |
| 7,647,392 B2 * | 1/2010 | Sharma et al. | 709/223 |
| 7,665,085 B2 * | 2/2010 | Sundararajan et al. | 717/174 |
| 7,694,140 B1 | 4/2010 | Sachenko et al. | |
| 7,770,151 B2 * | 8/2010 | Sanjar et al. | 717/109 |
| 7,822,826 B1 | 10/2010 | Savchenko et al. | |
| 7,822,860 B2 * | 10/2010 | Brown et al. | 709/228 |
| 7,836,441 B2 * | 11/2010 | Chen et al. | 717/168 |
| 7,856,631 B2 * | 12/2010 | Brodkorb et al. | 717/177 |
| 7,861,243 B2 | 12/2010 | Narayanaswamy et al. | |
| 7,890,956 B2 | 2/2011 | Angelov et al. | |
| 7,908,294 B2 * | 3/2011 | Ansari | 707/792 |
| 7,996,830 B2 * | 8/2011 | Apte et al. | 717/174 |

(Continued)

OTHER PUBLICATIONS

Houghton Mifflin Company, "The American Heritage College Dictionary", fourth edition; 2002; p. 441.*

(Continued)

*Primary Examiner* — Xi D Chen
(74) *Attorney, Agent, or Firm* — Lowenstein Sandler LLP (57) ABSTRACT

A method and apparatus for providing portability of a business process deployment model across different application servers. In one embodiment, a method may include determining which application server will be used for deploying a business process as a web application, and invoking an implementation framework of application server interfaces that corresponds to this application server. The method may further include utilizing the invoked implementation framework to obtain application server information needed for deploying the business process as a web application, and generating a web application package using the application server information.

23 Claims, 7 Drawing Sheets

(56) References Cited

U.S. PATENT DOCUMENTS

| | | | |
|---|---|---|---|
| 8,261,295 B1* | 9/2012 | Risbood et al. | 717/177 |
| 8,327,341 B2* | 12/2012 | Stark | 717/177 |
| 8,423,955 B2 | 4/2013 | Baeyens et al. | |
| 8,527,578 B2* | 9/2013 | DeHaan | 717/168 |
| 8,732,692 B2* | 5/2014 | Fangmeier et al. | 717/174 |
| 8,739,150 B2* | 5/2014 | Gass et al. | 717/174 |
| 8,825,713 B2 | 9/2014 | Guizar et al. | |
| 2002/0178254 A1 | 11/2002 | Brittenham et al. | |
| 2002/0178394 A1 | 11/2002 | Bamberger et al. | |
| 2003/0050932 A1* | 3/2003 | Pace et al. | 707/100 |
| 2003/0078934 A1 | 4/2003 | Cappellucci et al. | |
| 2003/0093321 A1 | 5/2003 | Bodmer et al. | |
| 2003/0225757 A1 | 12/2003 | Evans et al. | |
| 2003/0233503 A1 | 12/2003 | Yang et al. | |
| 2004/0034669 A1 | 2/2004 | Smith et al. | |
| 2004/0039748 A1 | 2/2004 | Jordan, II et al. | |
| 2004/0098311 A1 | 5/2004 | Nair et al. | |
| 2004/0128622 A1* | 7/2004 | Mountain et al. | 715/530 |
| 2004/0133876 A1 | 7/2004 | Sproule | |
| 2004/0177335 A1* | 9/2004 | Beisiegel et al. | 717/102 |
| 2004/0177352 A1* | 9/2004 | Narayanaswamy et al. | 717/169 |
| 2005/0010456 A1 | 1/2005 | Chang et al. | |
| 2005/0071243 A1 | 3/2005 | Somasekaran et al. | |
| 2005/0114771 A1 | 5/2005 | Piehler et al. | |
| 2005/0165932 A1 | 7/2005 | Banerjee et al. | |
| 2005/0172282 A1* | 8/2005 | Shenfield et al. | 717/174 |
| 2005/0204354 A1* | 9/2005 | Sundararajan et al. | 717/174 |
| 2005/0234890 A1 | 10/2005 | Enzler et al. | |
| 2005/0251468 A1 | 11/2005 | Eder | |
| 2005/0257217 A1* | 11/2005 | Woollen | 717/177 |
| 2005/0283837 A1 | 12/2005 | Olivier et al. | |
| 2006/0004783 A1 | 1/2006 | Carr et al. | |
| 2006/0101462 A1* | 5/2006 | Spears | 717/177 |
| 2006/0212846 A1 | 9/2006 | O'Farrell et al. | |
| 2007/0011322 A1* | 1/2007 | Moiso | 709/225 |
| 2007/0174317 A1 | 7/2007 | Bangel et al. | |
| 2007/0214113 A1 | 9/2007 | Lei et al. | |
| 2007/0219971 A1 | 9/2007 | Biermann et al. | |
| 2007/0226196 A1 | 9/2007 | Adya et al. | |
| 2007/0226233 A1 | 9/2007 | Walter et al. | |
| 2007/0240127 A1 | 10/2007 | Roques et al. | |
| 2007/0250575 A1* | 10/2007 | Tseitlin et al. | 709/205 |
| 2007/0260629 A1* | 11/2007 | Tseitlin et al. | 707/102 |
| 2007/0280111 A1 | 12/2007 | Lund | |
| 2008/0235682 A1 | 9/2008 | Oren et al. | |
| 2008/0255997 A1 | 10/2008 | Bluhm et al. | |
| 2008/0320486 A1 | 12/2008 | Bose et al. | |
| 2009/0063225 A1 | 3/2009 | Baeyens et al. | |
| 2009/0064104 A1 | 3/2009 | Baeyens et al. | |
| 2009/0070362 A1 | 3/2009 | Guizar et al. | |
| 2009/0070764 A1 | 3/2009 | Guizar et al. | |
| 2009/0183150 A1* | 7/2009 | Felts | 717/173 |
| 2010/0083273 A1 | 4/2010 | Sihn et al. | |
| 2010/0235445 A1 | 9/2010 | Palmeri et al. | |
| 2011/0283269 A1* | 11/2011 | Gass et al. | 717/168 |
| 2011/0283270 A1* | 11/2011 | Gass et al. | 717/168 |
| 2011/0296391 A1* | 12/2011 | Gass et al. | 717/168 |
| 2012/0266159 A1* | 10/2012 | Risbood et al. | 717/177 |

OTHER PUBLICATIONS

Flurry, Vicknair, "The IBM Applicaitn Framework for e-business", 2001, IBM Systems Journal; [retrieved on May 1, 2013]; Retrieved from Internet <URL:http:/www.zota.ase.ro/eb/flurry.pdf>; pp. 8-24.*

White, et al., "Automated Model-Based Configurtion of Enterprise Java Applications"; 2007 IEEE; [retrieved on Sep. 6, 2013]; Retrieved from Internet <URL:ftp://icm.linuxberg.com/packages/ace/ACE/PDF/white-automated.pdf>; pp. 1-12.*

Pramati Technologies, "Paramati Server Deployment Guide"; Mar. 2006, Pramati Technologies; [retrieved on Jun. 2, 2014]; Retrieved from Internet <URL: http://server.pramati.com/docstore/1500008/psy50deploy.pdf>; pp. 1-186.*

SAP, "ebj-j2ee-engine.dtd"; publish year unknown, SAP; [retrieved on Jun. 2, 2014]; Retrieved from Internet <URL: http://help.sap.com/saphelp-gateway20sp08/helpdata/en/37/30c557fad05341a951cfd051b/0b44/content.htm>;pp. 1-21.*

Asadi, et al., "Model-Driven Development of Families of Service-Oriented Architectures", 2009, ACM;[retrieved on Sep. 29, 2014]; Retreived from Inernet <URL: http://dl.acm.org/citation.cfm?id=1629716>;pp. 95-103.*

Napoli, Kaloyanova, "An Integrated Approach for RUP EA SOA and BPM implementation"; 2011, ACM; [retrieved on Sep. 29, 2014]; Retrived from Internet <URL:http://dl.acm.org/citation.cfm?id=2023607>;pp. 63-68.*

Sneed, et al., "Resuing Existing Object-oriented Code as Web Services in a SOA"; 2013 IEEE; [retrieved on Sep. 29, 2014]; Retrived from Internet <URL:http://ieeexplore.ieee.org/stamp/stamp.jsp?tp=&arnumber=6632732>;pp. 31-39.*

Hausotte, et al., "Always Stay Flexible! WfMS-independent Business Process Controlling in SOA"; 2011 IEEE; [retrieved on Sep. 29, 2014]; Retrived from Internet <URL:http://ieeexplore.ieee.org/stamp/stamp.jsp?tp=&arnumber=6037618>;pp. 184-193.*

"jbpm-bpel-1.0-alpha1," jBPM.org Files on SourceForge.net, Jun. 1, 2005. 44 pages.

"jbpm-bpel-1.0-alpha2," jBPM.org Files on SourceForge.net, Jun. 24, 2005, 41 pages.

"jbpm-bpel-1.0-alpha3," jBPM.org Files on SourceForge.net, Sep. 6, 2005, 51 pages.

"jbpm-bpel-1.0-alpha4," jBPM.org Files on SourceForge.net, Dec. 26, 2005, 55 pages.

"jbpm-bpel-1.1-beta1," jBPM.org Files on SourceForge.net, Jun. 11, 2006, 58 pages.

Koenig, John, "JBoss jBPM," White Paper, www.riseforth.com, Nov. 2004. 10 pages.

Websphere Message Broker Manual, publib.boulder.ibm.com/infocenter/wmbhelp/v6r0m0/index.jsp, Sep. 30, 2005.

Office Action for U.S. Appl. No. 11/897,910, mailed Feb. 2, 2011.
Office Action for U.S. Appl. No. 11/900,707, mailed May 13, 2011.
Office Action for U.S. Appl. No. 11/900,740, mailed Oct. 2, 2009.
Office Action for U.S. Appl. No. 11/900,740, mailed Mar. 24, 2010.
Office Action for U.S. Appl. No. 11/900,740, mailed Sep. 21, 2010.

IBM Websphere Application Server 5.1 Documentation, "Develop Web service deployment descriptor templates from the WSDL file", Version 5, Release 3, Oct. 4, 2005. publib.boulder.ibm.com/infocenter/iseries/v5r3/index.jsp?topic=%2Frzatz%2Fwebserv%2Fwsdevddtemp.htm.

IBM Websphere 6 Documentation, "WebSphere MQ custom properties" Sep. 2, 2006. publib.boulder.ibm.com/infocenter/wasinfo/v6r1/index.jsp?topic%=2Fcom.ibm.websphere.base.doc%2Finfo%2Faes%2Fcmm_customprops.html.

IBM WebSphere 6 Documentation, "Publish/subscribe messaging example using remote publication points," Oct. 5, 2005. publib.boulder.ibm.com/infocenter/dmndhelp/v6rxmx/index.jsp?topic=/com.ibm.websphere.pmc.nd.doc/concepts/cjo_remote_pubsub.html.

Sun Microsystems, "Java2 Enterprise Edition Deployment API 1.1", 2002; [retrieved on Oct. 17, 2011]; Retrived from Internet <URL:http://java.sun.com/2ee/tools/deployment/88ChangeLog1/1-aug2802.html;pp. 1-10.

Bea Systems, Inc. "Deploying WebLogic Platform Applications, Version 8.1 Service Pack 6", Jun. 2006. [retrieved on May 25, 2011]. Retrieved from Internet, URL:http://download.oracle.com/docs/cdE13196_01/platform/docs81/pdf/deploy.pdf>; pp. 1-172.

Apte, Ajay "IBM WebSphere Developer Technical Journal: System Administration for WebSphere Application Server V5, Part 6—Application Management," Sep. 10, 2003, 8 pages.

Baeyens, Tom, "The State of Workflow," Jboss, May 28, 2007, 14 pages. http://www.ibm.com/developerworks/websphere/techjournal/0309_apte/apte.html.

Abstraction Layer as of Aug. 2, 2007 http://en.wikipedia.org/w/index.php?title=Abstraction_layer&oldid=148731044.

Red Hat Office Action for U.S. Appl. No. 11/879,910, mailed Aug. 5, 2011.

Red Hat Office Action for U.S. Appl. No. 11/897,910, mailed Nov. 18, 2011.

(56) References Cited

OTHER PUBLICATIONS

Red Hat Office Action for U.S. Appl. No. 11/897,910, mailed Mar. 19, 2012.
Red Hat Office Action for U.S. Appl. No. 11/900,707, mailed Nov. 9, 2011.
Red Hat Office Action for U.S. Appl. No. 11/900,740, mailed May 9, 2011.
Red Hat Office Action for U.S. Appl. No. 11/900,740, mailed Sep. 27, 2011.
Red Hat Office Action for U.S. Appl. No. 11/900,740, mailed Mar. 1, 2012.
Red Hat Office Action for U.S. Appl. No. 11/897,570, mailed Jun. 1, 2011.
Red Hat Office Action for U.S. Appl. No. 11/897,570, mailed Oct. 24, 2011.
IBM Corp., "WebSphere MQ Version 6.0—System Administration Guide", Feb. 15, 2005.
IBM Corp., "iSeries WebSphere Application Server—Express Version 5.1", May 13, 2003.
Altentee, "Monitoring Queue Statistics in MQ," Apr. 30, 2007, altentee.com/blogs/2007/monitoring-queue-statistics-in-mq/.
Various Authors, "MQSeries.net:: View Topic—How can you keeping running total msgs per Queue for the day?," Aug. 26, 2005, www.mqseries.net/phpBB2/viewtopic.php?t=24005.
IBM, "Artifacts used to develop Web services based on Web Services for J2EE"; 2005, IBM online knowledge base; [retrieved on Jan. 26, 2013]; retrieved from Internet <URL:http://publib.boulder.ibm.com/infocenter/adiehelp/v5rlm1/topic/com.ibm.wasee.doc/ino/e . . . >; pp. 1-2.
USPTO Office Action for U.S. Appl. No. 11/897,910, mailed Aug. 8, 2012.
USPTO Notice of Allowance for U.S. Appl. No. 11/897,910, mailed Dec. 18, 2012.
USPTO Office Action for U.S. Appl. No. 11/900,707, mailed Apr. 25, 2012.
USPTO Office Action for U.S. Appl. No. 11/900,707, mailed Nov. 7, 2012.
USPTO Office Action for U.S. Appl. No. 11/900,740, mailed Oct. 25, 2012.
USPTO Office Action for U.S. Appl. No. 11/897,570, mailed Sep. 28, 2012.
USPTO Office Action for U.S. Appl. No. 11/897,570, mailed Jan. 29, 2013.
SYBASE Chapter, First Edition: SYBASE Data Types; http://www.okstate.edu/sas/v8/sashtml/accdb/z0439559.htm, accessed Mar. 4, 2013.
PostgreSQL:Documentation 8.4: Data Types; http://www.postgresql.org/docs/8.4/static/datatype.html, accessed Mar. 4, 2013.
Oracle Datatypes; http://docs.oracle.com/cd/B19306_01/server.102/b14200/sql_elements00, accessed Mar. 4, 2013.
USPTO; Office Action for U.S. Appl. No. 11/897,570, mailed May 17, 2013.
USPTO; Office Action for U.S. Appl. No. 11/900,740, mailed May 6, 2013.
Unknown Author, "Help—WebSphere MQ", Aug. 17, 2005, publib.boulder.ibm.com/infocenter/wmqv6/v6r0/index.jsp?topic=%2Fcom.ibm.mq.amqtac.doc%2Fwq10160_.htm, tasks 5 and 16.
USPTO; Office Action for U.S. Appl. No. 11/897,570, mailed Oct. 4, 2013.
USPTO; Office Action for U.S. Appl. No. 11/900,707, mailed Oct. 7, 2013.
USPTO; Office Action for U.S. Appl. No. 11/900,740, mailed Aug. 30, 2013.
Red Hat Office Action for U.S. Appl. No. 11/897,570, mailed Feb. 18, 2014.
Atenzi et al. "Model-Independent Schema and Data translation", EDBT 2006.
MQ Status Monitor (Unknown Author, "WebSphere MQ Status Monitor", 193,138,212,37/SiteScope/docs/MOStatMon.htm, Jan 20, 2004).
IBM, "IBM Business Process Manager Advanced Installation Guide", 2005, IBM Corp., [retrieved from Internet <URL:ftp://dhempanon02.mul.ie.ibm.com/software/integration/business-processmanager/library/pdf850/imuc_ebpm_dist_pdf_en.pdf>;pp. 1-1089.
Unknown Author, How the maximum sessions property on the listener port affects WebSphere Application Server Performance, www.ibm.com/developerworks/websphere/library/techarticles/0602_kesavan/0602_kesavan.html, Feb. 8, 2006.
Red Hat Office Action for U.S. Appl. No. 11/897,570, mailed Jul. 16, 2014.
Red Hat Office Action for U.S. Appl. No. 11/900,707, mailed May 20, 2014.
Red Hat Notice of Allowance for U.S. Appl. No. 11/900,707, mailed Aug. 15, 2014.
USPTO, Office Action for U.S. Appl. No. 11/900,740 mailed Dec. 13, 2013.
USPTO, Notice of Allowance for U.S. Appl. No. 11/900,740 mailed Apr. 23, 2014.
Unknown Author, Configuring the Autonomic request flow manager, pic.dhe.ibm.com/infocenter/wxdinfo/v6r1 /topic/com.ibm.websphere.ops.doc/info/odoe task!todtunearfm.html, Nov. 2004.

\* cited by examiner

```
<definitions targetNamespace="http://jbpm.org/examples/hello"
 xmlns:tns="http://jbpm.org/examples/hello"
 xmlns:soap="http://schemas.xmlsoap.org/wsdl/soap/"
 xmlns="http://schemas.xmlsoap.org/wsdl/">

<!-- makes WSDL interface elements available to binding elements -->
<import namespace="http://jbpm.org/examples/hello" location="hello.wsdl"/>

<!-- provides SOAP 1.1 protocol details for the Greeter interface-->
<binding name="GreeterBinding" type="tns:Greeter">
  <soap:binding style="rpc" transport="http://schemas.xmlsoap.org/soap/http"/>
  <operation name="sayHello">
    <soap:operation soapAction="http://jbpm.org/examples/sayHello"/>
    <input>
      <soap:body use="literal" namespace="http://jbpm.org/examples/hello"/>
    </input>
    <output>
      <soap:body use="literal" namespace="http://jbpm.org/examples/hello"/>
    </output>
  </operation>
</binding>
</definitions>
```

FIG. 5B

```
<?xml version="1.0" encoding="UTF-8"?>
<definitions targetNamespace="http://jbpm.org/examples/hello" xmlns:tns="http://
jbpm.org/examples/hello" xmlns:soap="http://schemas.xmlsoap.org/wsdl/soap/"
xmlns="http://schemas.xmlsoap.org/wsdl/">
    <import namespace="http://jbpm.org/examples/hello" location="hello-binding-
1.wsdl">
    </import>
    <!-- groups all ports served by the business process -->
    <service name="HelloWorldService">
        <!-- supplies the concrete access location for the SOAP 1.1 binding
        of the Greeter interface -->
        <port name="GreeterPort" binding="tns:GreeterBinding">
            <soap:address location="http://localhost:8080/hello/Greeter"/>
        </port>
    </service>
</definitions>
```

PORTABLE BUSINESS PROCESS DEPLOYMENT MODEL ACROSS DIFFERENT APPLICATION SERVERS

TECHNICAL FIELD

Embodiments of the present invention relate to business process management (BPM), and more specifically to providing portability of a business process deployment model across different application servers.

BACKGROUND

Business process management (BPM) offers a programmatic structure for designing transactions and executing them using automated decisions, tasks and sequence flows. For example, an insurance company can use BPM to automate the steps involved in processing insurance claims. BPM solutions typically include a process definition tool, an engine that executes process definitions, and tools that aid process monitoring.

A process definition tool allows a process designer to specify a definition of a business process using a particular business process language. One exemplary language is the business process execution language (BPEL). BPEL is intended for business processes that interact with external entities through web service operations. BPEL's messaging facilities depend on the use of the web services description language (WSDL) to describe outgoing and incoming messages.

When a BPEL process is defined, it can be deployed as a web application using the Java 2 Enterprise Edition (J2EE) web services deployment model. A typical web services deployment model is tied to a specific application server to which the web application will be deployed. For example, jBPM BPEL, a tool used by JBoss division of Red Hat Inc., is operable with the JBoss Application Server version 4.0.3 but not with other application servers or other versions of the JBoss Application Server. This creates inconvenience and extra expenses for customers who either have to replace their existing application server or purchase a different BPM system that is operable with their existing application server.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and apparatus for providing portability of a business process deployment model across different application servers. In one embodiment, a deployment server determines which application server is being used for deploying a business process as a web application, and invokes an implementation framework of application server interfaces that corresponds to this application server. The deployment server then utilizes the invoked implementation framework to obtain application server information needed for deploying the business process as the web application, and generates a web application package using the application server information.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
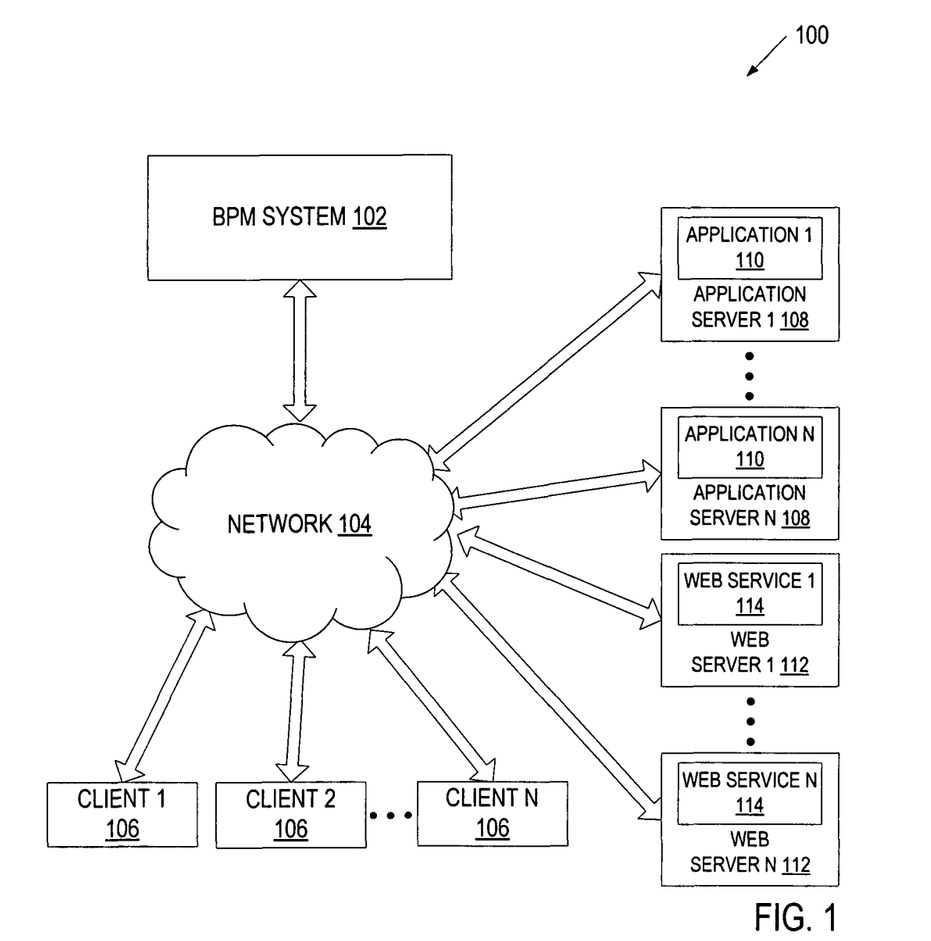
FIG. 1 illustrates an exemplary network architecture in which embodiments of the invention may operate.

FIG. 1 illustrates an exemplary network architecture 100 in which embodiments of the present invention may operate. The network architecture 100 may include client devices (clients) 106, a BPM system 102 and a network 104. The clients 102 may be, for example, personal computers (PCs), mobile phones, palm-sized computing devices, personal digital assistants (PDAs), etc.

The clients 106 are coupled to the BPM system 102 via the network 104, which may be a public network (e.g., Internet) or a private network (e.g., Ethernet or a local area Network (LAN)). The BPM system 102 may include one or more servers providing BPM functionality. In particular, the BPM system 102 may allow process developers to define business processes using a business process language such as BPEL or any other language allowing interaction with external entities through web service operations (e.g., web services flow language (WSFL) or business process modeling language (BPML)). Clients 106 may host browser applications to present user interfaces for defining business processes to their users.

The BPM system 102 automates the deployment of business processes as web applications. In one embodiment, the BPM system 102 uses the J2EE web services deployment model defined in the J2EE specification (e.g., J2EE version 1.4 specification). The J2EE web services deployment model requires a set of documents that define how to deploy and assemble components into a specific environment. These documents should include deployment details that are only known to the application server to which the web application will be deployed. For example, the deployment details may specify the location of the web service(s) produced by the business process and binding information (e.g., protocol details for messages sent by a web service) for each web service. The J2EE specification does not provide a standard mechanism for obtaining the deployment details from the application server. Embodiments of the present invention facilitate integration with various application servers by providing implementation frameworks corresponding to individual application servers. Each implementation framework customizes a set of application server interfaces based on unique features of the relevant application server. The application servers may be of different types and/or versions. For example, versions 4.0.3 and 4.0.4 of the JBoss Application Server may be associated with different implementation frameworks because they need different mechanisms for obtaining deployment details required by the J2EE web services deployment model.

Upon creating the documents required by the J2EE web services deployment model, the BPM system 102 builds a web application package for the business process and deploys it to the application server. Subsequently, the BPM system 102 can execute the business process using a BPM process engine. The BPM system 102 may provide user interfaces to allow users of clients 106 to interact with execution of the business process, monitor the execution of the business process, and view statistics about the business process execution. Users of clients 106 may include, for example, process developers, system administrators, business analysts, etc.

The network architecture 100 may also include application servers 108 hosting external applications 110, and/or web servers 112 hosting external web services 112. During execution, the business process may interact with external applications 110 and/or external web services 114 by invoking external applications 110 and/or web services 114 or exchanging data with external applications 110 and/or web services 114.

Figure 2:
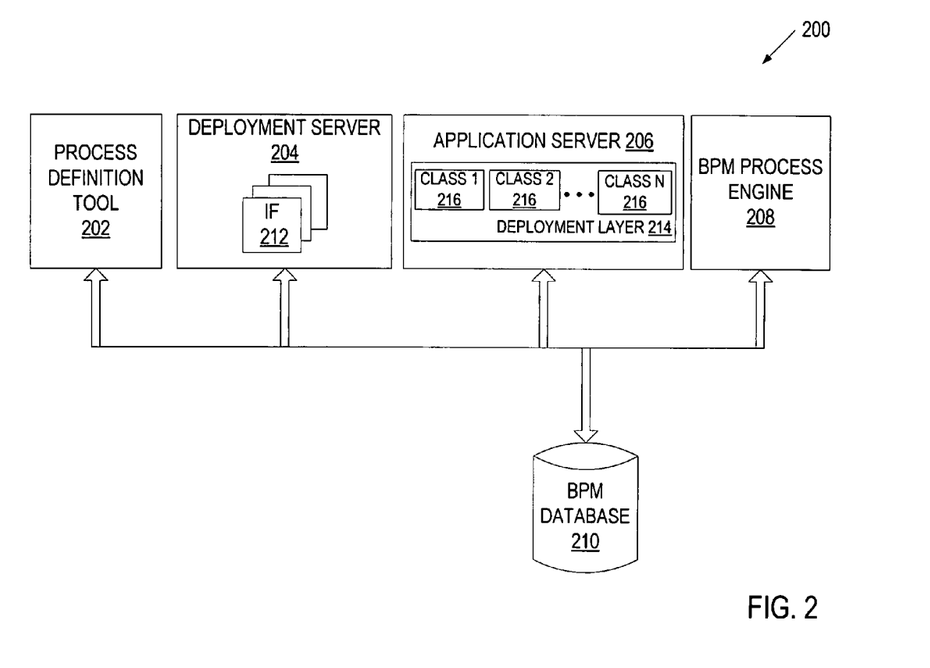
FIG. 2 illustrates a block diagram of one embodiment of a BPM system.

FIG. 2 is a block diagram of one embodiment of a BPM system 200. The BPM system 200 may include a process definition tool 202, a deployment server 204, an application server 206, a BPM process engine 208, and a BPM database 210. Some or all of the above components of the BPM system 200 may reside on the same machine or different machines coupled via a network (e.g., public network such as Internet or private network such as Intranet).

The process definition tool 202 allows users (e.g., process developers) to define business processes using one or more business process languages. These business process languages may include, for example, BPEL, WSFL, BPML, etc. When the user provides a definition of a business process, the process definition tool 202 stores the definition of the business process in the BPM database 210.

The deployment server 204 is responsible for automated deployment of the business process as a web application. In one embodiment, the deployment server 204 uses the J2EE web services deployment model. The J2EE web services deployment model requires a set of documents that define how to deploy and assemble components into a specific environment. These documents need to include deployment details that are only known to the application server to which the web application will be deployed. For example, the deployment details may specify the location of the web service(s) produced by the business process and binding information (e.g., protocol details for messages to be sent by a web service) for each web service. The protocol details may specify the format in which messages should be sent, the transport layer, the protocol to be used for the messages, etc. The deployment server 204 is not tied to a specific application server. Instead, the deployment server 204 can be integrated with various application servers and/or application server versions by using different implementation frameworks 212 of a set of application server interfaces (e.g., application server APIs). Each implementation framework 212 is associated with a distinct application server type or a distinct application server version.

The deployment server 204 determines the type and/or version of the application server to which the web application will be deployed. In one embodiment, the BPM database 210 stores characteristics pertaining to different components of the BPM system 200, and the deployment server 204 queries specific aspects of the application server 206 for the type and/or version of the application server 206. Based on the type and/or version of the application server 206, the deployment server 204 invokes a relevant implementation framework 212 to obtain deployment details required for the J2EE web services deployment model from the application server 206.

In one embodiment, the application server 206 includes a deployment layer 214 that handles web applications deployed to the application server 206 to prepare them for runtime operations. The deployment layer 214 is composed of various classes 216, including classes that maintain deployment details required for the J2EE web services deployment model. In one embodiment, the implementation framework 212 knows which classes maintain the deployment details and interacts with these classes to obtain the deployment details. For example, the implementation framework 212 may request location information for each web service produced by the business process from class 1 and may request binding information (e.g., protocol details for messages to be sent by each web service) for each web service from class 2. The classes maintaining the deployment details and/or mechanisms for obtaining the deployment details may vary for different types and/or versions of application servers. These differences result in distinct functionality of individual implementation frameworks 212.

Upon obtaining the deployment details from the application server 206, the deployment server 204 generates documents required by the J2EE web services deployment model, builds a web archive for the web application using these documents, and deploys the web archive to the application server 206.

The application server 206 makes the business process accessible to external clients. The BPM process engine 208 manages execution of the business process. In one embodiment, the BPM process engine 208 uses web services for (Java 2) Enterprise Edition (WSEE) to manage web service operations produced by the business process. The BPM process engine 208 may provide a GUI allowing a user (e.g., a system administrator) to interact with runtime tasks generated by the process execution. The BPM process engine 208 stores runtime execution data in a BPM database 210.

Figure 3:
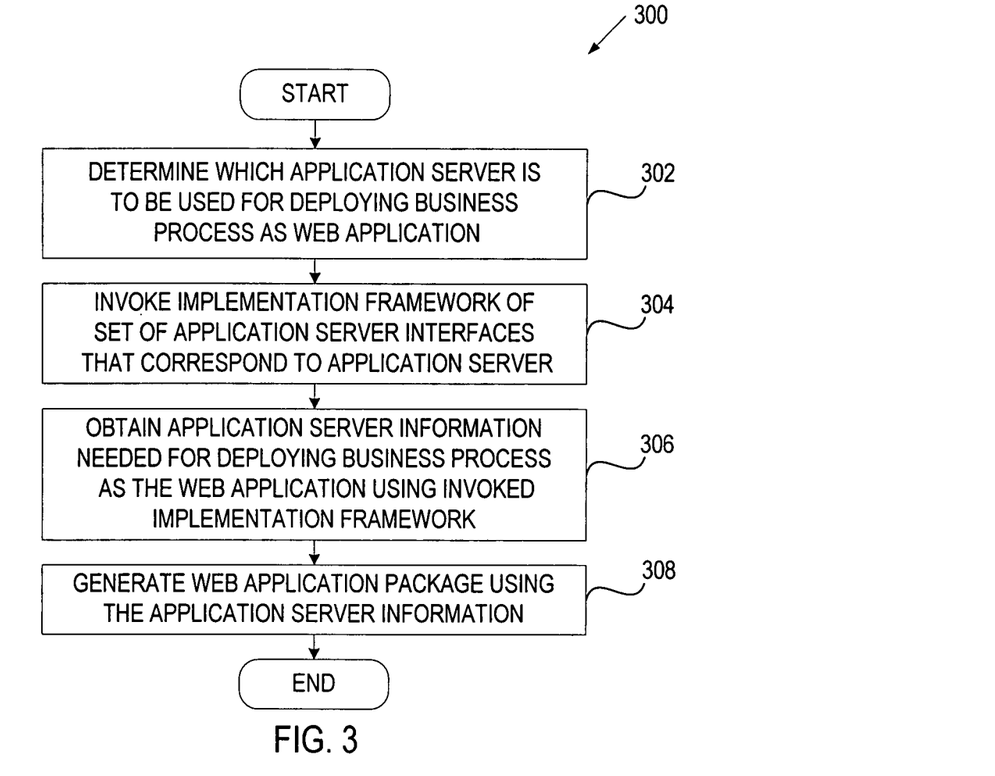
FIG. 3 illustrates a flow diagram of one embodiment of a method for utilizing a business process deployment model portable across different application servers.

FIG. 3 illustrates a flow diagram of one embodiment of a method 300 for utilizing a business process deployment model portable across different application servers. The method may be performed by processing logic that may comprise hardware (e.g., circuitry, dedicated logic, programmable logic, microcode, etc.), software (such as instructions run on a processing device), or a combination thereof. In one embodiment, method 300 is performed by BPM system 102 of FIG. 1.

Referring to FIG. 3, method 300 begins with processing logic determining which application server is being used for deploying a business process as a web application (block 302). In one embodiment, processing logic queries specific aspects of the application server for the type and/or version of the application server. The business process may be a BPEL process, a WSFL process, a BPML process, etc.

At block 304, processing logic invokes an implementation framework of application server interfaces that corresponds to the type and/or version of the application server. As discussed above, different implementation frameworks are used for integration with different application servers.

At block 306, processing logic uses the invoked implementation framework to obtain application server information needed for deployment of the business process as a web application. The application server information may include, for example, deployment information maintained by the application server such as the location of each web service produced by the business process, binding information (e.g., protocol details) for each web service, etc.

At block 308, processing logic generates a web application package using the information obtained from the application server, and then deploys the web application package to the application sever. One embodiment of a method for generating a web application package will be discussed in more detail below in conjunction with FIG. 4.

As discussed above, a business process may be defined using BPEL. The definition of a BPEL process may include a BPEL document and one or more web services description language (WSDL) interface documents. The BPEL document may include one or more partner links to establish a relationship with one or more clients of the process, and the roles the process will play for the partner links. The BEPL document may also specify a sequence of activities to be performed by the process and variables to be used by the process. The WSDL interface documents describe the interface of the process that will be presented to the outside world. According to the WSDL specification, different elements of a service definition may be separated into independent documents according to their level of abstraction. Such levels may include data type definitions, abstract definitions and specific service bindings. The BPEL document and the WSDL interface documents may be specified by a user (e.g., a business process designer) and stored in the BPM database.

Figure 4:
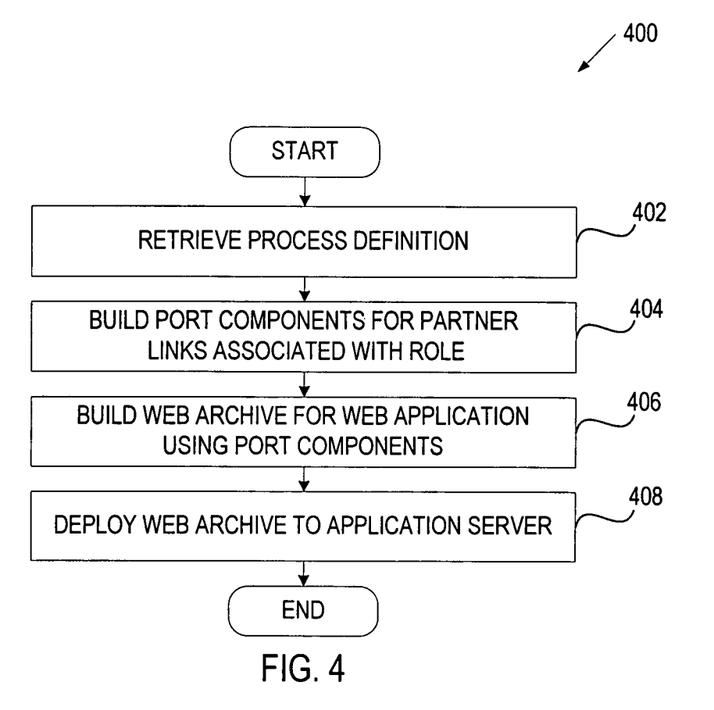
FIG. 4 illustrates a flow diagram of one embodiment of a method for transforming a definition of a business process into a web application package.

FIG. 4 illustrates a flow diagram of one embodiment of a method 400 for transforming a definition of a BPEL process into a web application package. The method may be performed by processing logic that may comprise hardware (e.g., circuitry, dedicated logic, programmable logic, microcode, etc.), software (such as instructions run on a processing device), or a combination thereof. In one embodiment, method 300 is performed by BPM system 102 of FIG. 1.

At block 402, processing logic retrieves a definition of a BPEL process. As discussed above, a definition of the BPEL process may include a BPEL document specifying one or more partner links and the roles the process will play for the partner links, and WSDL interface documents describing the interface of the process that will be presented to the outside world.

When executing web services produced by the business process in WSEE, a port component defines the server view of a web service. Hence, at block 404, processing logic builds port components for all partner links that define a process role as specified in the definition of the business process (e.g., partnerLink elements having a myRole attribute). In particular, port components may include WSDL implementation documents created based on the BPEL document and WSDL interface documents, Java mapping artifacts required for a WSEE deployment, web component deployment descriptors for servlets representing Java service endpoints from the Java mapping artifacts, and web services deployment descriptors to specify endpoints to be deployed in a servlet container. The WSDL implementation documents include binding details obtained from the application server. An exemplary WSDL implementation document will be discussed in more detail below in conjunction with FIG. 5B.

At block 406, processing logic builds a web archive for the web application using the port components created at block 404. In one embodiment, processing logic builds the web archive upon receiving a designated command from a user.

At block 408, processing logic deploys the web archive to the application server. In particular, in one embodiment, processing logic copies the web archive to a specific directory (e.g., deploy directory) of the application server. The business process then becomes fully accessible to external clients through its endpoint address.

Figure 5A:
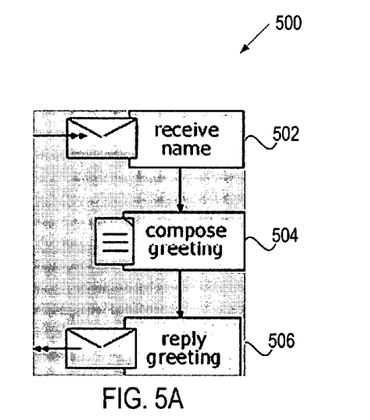
FIG. 5A illustrates an exemplary BPEL process.

FIG. 5A illustrates an exemplary BPEL process 500 that includes step 502 to receive a message carrying the name of a person, step 504 to compose a greeting phrase containing the name, and step 506 to reply with a message carrying the greeting. A BPEL document for process 500 will define a partner link to establish a relationship with the client of the process and two variables to hold the incoming and outgoing messages. The BPEL document may also specify a sequence of activities that receive a request message from a client, prepares a response message, and sends it back.

A WSDL document may define two messages that respectively carry the name and the greeting, the port type that describes the interface that the process presents to its callers, and a partner link type to characterize the relationship between the greeter and the caller. The WSDL document may also define the roles played by each service and specify the interfaces (port types) they expose to each other.

Figure 5B:
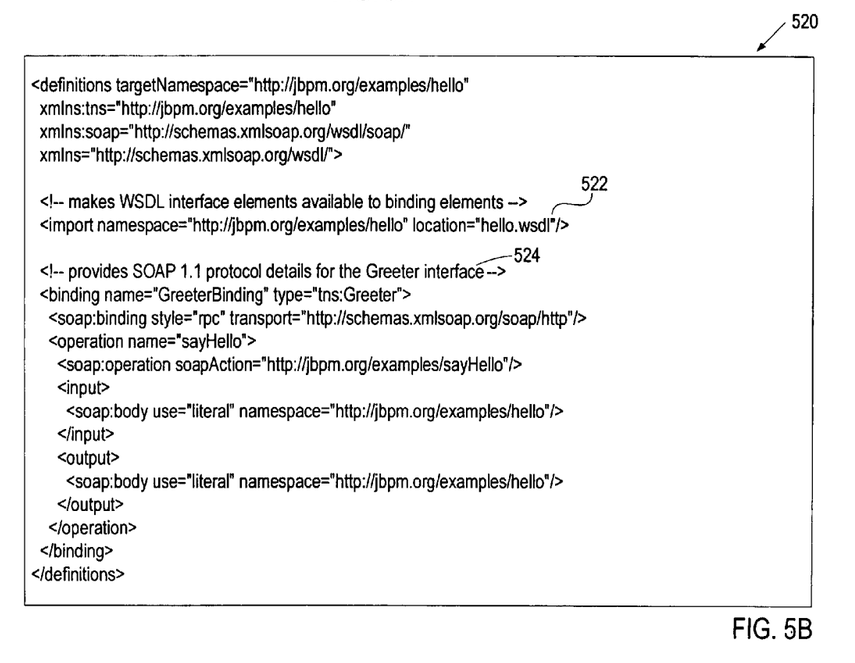
FIGS. 5B and 5C illustrate exemplary WSDL implementation documents generated for a partner link specified in a business process definition.
Figure 5C:
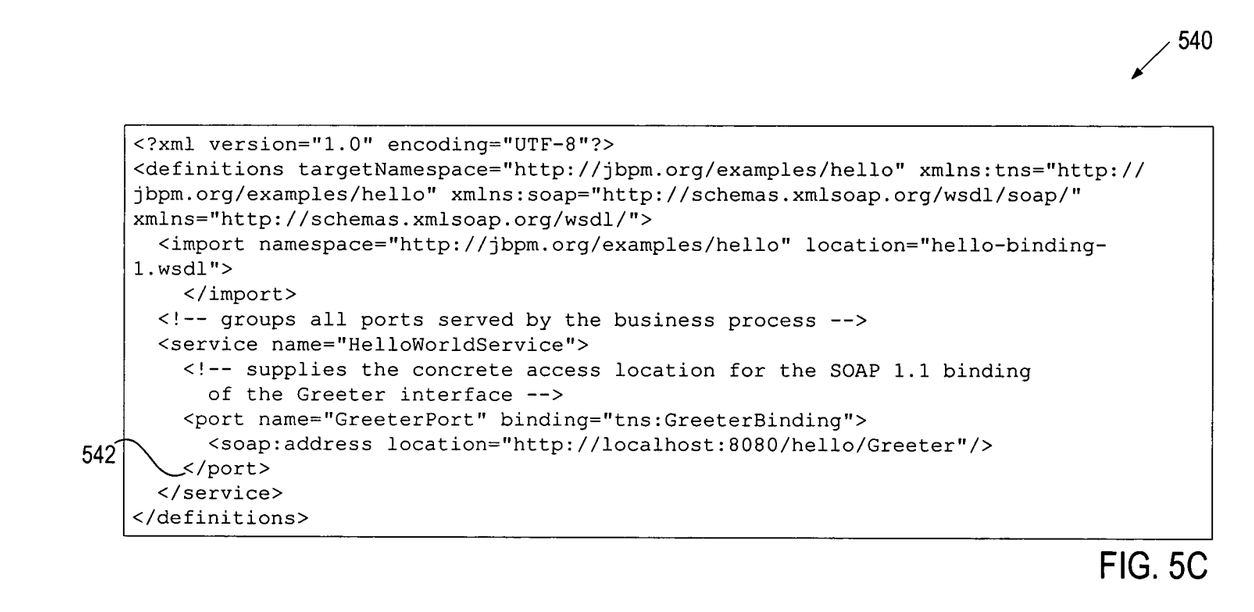

When the deployment server builds port components for the partner link defined in the BPEL document of the process 500, it generates WSDL implementation documents that include an interface implementation document corresponding to the WSDL interface document (but whose definitions are available to the port component), a binding document containing the SOAP binding for the port type, and a service document containing a service element in the target namespace of the process. FIGS. 5B and 5C illustrate exemplary binding document 520 and service document 540 for business process 500 of FIG. 5A. Binding document 520 provides a reference to the abstract definitions 522 of the web service produced by the business process 500 and SOAP protocol details 524 for the web service interface. The target namespace for this document is the same as that of the port type. If the process implemented other port types belonging to this namespace, bindings for port types on other namespaces would be placed in a separate binding file. Service document 540 provides location information of the web service produced by the business process 500.

Figure 6:
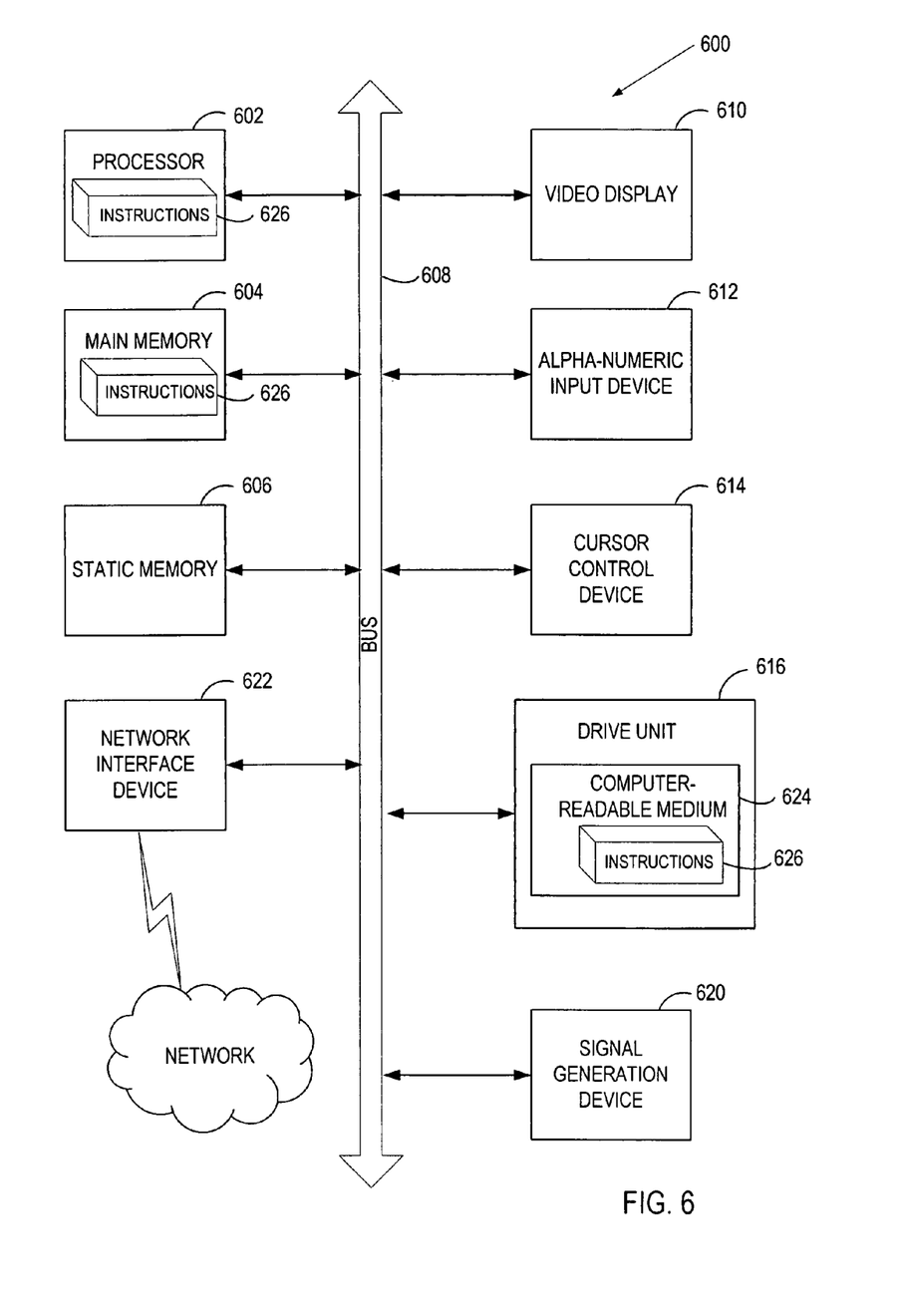
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving, by a process definition tool of a business process management (BPM) system, a definition of a business process, wherein the definition uses a business process execution language (BPEL) and comprises a BPEL process definition document and a web services description language (WSDL) interface document;
    storing, by the processing definition tool, the definition of the business process in a BPM database of the BPM system;

determining, by a deployment server of the BPM system and from the definition of the business process, an application server of a plurality of application servers to which the business process will be deployed as a web application;

invoking a first implementation framework of a plurality of implementation frameworks, wherein the first implementation framework is associated with the application server, and wherein each of the plurality of implementation frameworks is associated with a different application server type of the plurality of application servers;

obtaining, by a processing device, application server information for deploying the business process as the web application using the first implementation framework, wherein the first implementation framework accesses application server classes in a deployment layer of the application server to obtain the application server information, wherein the application server information is used by a J2EE web services deployment model to deploy the business process as a web application and comprises binding information for a web service produced by the business process, the binding information comprising a transport layer to be used for messages sent by the web service;

generating, by a BPM process engine of the BPM system, a web application package for the business process using the application server information; and deploying the web application package to the application server.

2. The method of claim 1 wherein the plurality of application servers comprises a plurality of different application server types.

3. The method of claim 1 wherein the plurality of application servers comprises different versions of an application server type.

4. The method of claim 1 wherein the application server information comprises a location of each web service produced by the business process.

5. The method of claim 4 wherein obtaining the application server information comprises:

sending a request for a web service location to a first application server class maintaining web service location information; and sending a request for web service binding information to a second application server class maintaining web service binding information.

6. The method of claim 1 wherein the web service binding information further comprises at least one of a format of messages to be sent by a web service or a protocol to be used for sending the messages.

7. The method of claim 1 wherein
the definition of the business process specifies one or more partner links and one or more roles associated with the partner links.

8. The method of claim 7 wherein generating the web application package comprises:

building a port component for each partner link associated with a role; and building a web archive for the web application using port components created for the partner links.

9. The method of claim 8 wherein building the port component comprises:

generating WSDL implementation documents using the definition of the business process, the WSDL implementation documents comprising an interface document, a SOAP binding document for each web service produced by the BPEL process, and a service element document; and generating Java mapping artifacts using the WSDL implementation documents.

10. The method of claim 9 wherein the SOAP binding document and the service element document are generated using the application server information that includes a location of each web service and SOAP protocol details for each web service.

11. A system comprising:

a memory; and a processing device, coupled to the memory, the processing device to:

receive, by a process definition tool of a business process management (BPM) system, a definition of a business process, wherein the definition uses a business process execution language (BPEL) and comprises a BPEL process definition document and a web services description language (WSDL) interface document;

store, by the processing definition tool, the definition of the business process in a BPM database of the BPM system;

determine, by a deployment server of the BPM system and from the definition of the business process, an application server of a plurality of application servers to which the business process will be deployed as a web application;

invoke a first implementation framework from a plurality of implementation frameworks, wherein the first implementation framework is associated with the application server, and wherein each of the plurality of implementation frameworks is associated with a different application server type of the plurality of application servers;

obtain application server information for deploying the business process as the web application using the first implementation framework, wherein the first implementation framework accesses application server classes in a deployment layer of the application server to obtain the application server information, wherein the application server information is used by a J2EE web services deployment model to deploy the business process as a web application and comprises binding information for a web service produced by the business process, the binding information comprising a transport layer to be used for messages sent by the web service;

generate, by a BPM process engine of the BPM system, a web application package for the business process using the application server information; and deploy the web application package to the application server.

12. The system of claim 11 wherein the plurality of application servers comprises a plurality of different application server types.

13. The system of claim 11 wherein the application server information comprises a location of each web service produced by the business process.

14. The system of claim 13 wherein to obtain the application server information, the processing device further to:

send a request for a web service location to a first application server class maintaining web service location information; and send a request for web service binding information to a second application server class maintaining web service binding information.

15. The system of claim 11 wherein the web service binding information further comprises at least one of a format of messages to be sent by a web service or a protocol to be used for sending the messages.

16. The system of claim 11 wherein
the definition of the business process specifies one or more partner links and one or more roles associated with the partner links.

17. The system of claim 16 wherein to generate the web application package, the processing device further to:
build a port component for each partner link associated with a role; and
build a web archive for the web application using port components created for the partner links.

18. The system of claim 17 wherein to build the port component, the processing device further to:
generate WSDL implementation documents using the definition of the business process, the WSDL implementation documents comprising an interface document, a SOAP binding document for each web service produced by the BPEL process, and a service element document, the SOAP binding document and the service element document being generated using the application server information that includes a location of each web service and SOAP protocol details for each web service; and
generate Java mapping artifacts using the WSDL implementation documents.

19. A non-transitory computer-readable storage medium including data that, when accessed by a processing device, cause the processing device to perform operations comprising:
receiving, by a process definition tool of a business process management (BPM) system, a definition of a business process, wherein the definition uses a business process execution language (BPEL) and comprises a BPEL process definition document and a web services description language (WSDL) interface document;
storing, by the processing definition tool, the definition of the business process in a BPM database of the BPM system;
determining, by a deployment server of the BPM system and from the definition of the business process, an application server of a plurality of application servers to which the business process will be deployed as a web application;
invoking a first implementation framework of a plurality of implementation frameworks, wherein the first implementation framework is associated with the application server, and wherein each of the plurality of implementation frameworks is associated with a different application server type of the plurality of application servers;
obtaining, by the processing device, application server information for deploying the business process as the web application using the first implementation framework, wherein the first implementation framework accesses application server classes in a deployment layer of the application server to obtain the application server information, wherein the application server information is used by a J2EE web services deployment model to deploy the business process as a web application and comprises binding information for a web service produced by the business process, the binding information comprising a transport layer to be used for messages sent by the web service;
generating, by a BPM process engine of the BPM system, a web application package for the business process using the application server information; and
deploying the web application package to the application server.

20. The non-transitory computer-readable storage medium of claim 19 wherein the plurality of application servers comprises a plurality of different application server types.

21. The non-transitory computer-readable storage medium of claim 19 wherein the application server information comprises a location of each web service produced by the business process.

22. The non-transitory computer-readable storage medium of claim 21 wherein obtaining the application server information comprises:
sending a request for a web service location to a first application server class maintaining web service location information; and
sending a request for web service binding information to a second application server class maintaining web service binding information.

23. The non-transitory computer-readable storage medium of claim 19 wherein the web service binding information further comprises at least one of a format of messages to be sent by a web service or a protocol to be used for sending the messages.

* * * * *